US00RE41795E

(19) United States
(12) Reissued Patent
Dalton et al.

(10) Patent Number: US RE41,795 E
(45) Date of Reissued Patent: Oct. 5, 2010

(54) LIGHTING DEVICE

(75) Inventors: David R. Dalton, New South Wales (AU); Angelo Kotsis, New South Wales (AU); John Robert Brown, Mosman (AU)

(73) Assignee: Eveready Battery Company, Inc., St. Louis, MO (US)

(21) Appl. No.: 12/486,042
(22) Filed: Jun. 17, 2009

Related U.S. Patent Documents

Reissue of:
(64) Patent No.: 7,524,081
Issued: Apr. 28, 2009
Appl. No.: 11/338,986
Filed: Jan. 25, 2006

U.S. Applications:
(63) Continuation of application No. 10/474,389, filed as application No. PCT/AU02/00415 on Mar. 28, 2002, now Pat. No. 7,021,789.

(30) Foreign Application Priority Data

Apr. 9, 2001 (AU) ..... PR4297
Apr. 23, 2001 (AU) ..... PR4541

(51) Int. Cl.
*F21L 4/04* (2006.01)

(52) U.S. Cl. ..... 362/199; 362/196; 362/200; 362/249.03; 362/269; 362/285; 362/427

(58) Field of Classification Search ..... 362/98, 362/154–155, 184, 196–199, 233, 249.01, 362/249.02, 249.03, 269, 285, 418, 427
See application file for complete search history.

(56) References Cited

U.S. PATENT DOCUMENTS 4,148,045 A * 4/1979 Fang et al. ..... 257/90
(Continued)

FOREIGN PATENT DOCUMENTS

CA 985664 A 3/1976

(Continued)

OTHER PUBLICATIONS

George McDaniel, IBM Dictionary of Computing, 1994, p. 387, Tenth Edition, McGraw–Hill, Inc.
(Continued)

*Primary Examiner*—Jason Moon Han
(74) *Attorney, Agent, or Firm*—Gregory J. Adams

(57) ABSTRACT

The present invention provides a lighting device having a light housing [including a light source being rotatably connected by a rotatable connection means to a lighting device body, said body having said rotatable connection means positioned so as to allow said light housing to lay adjacent said body and to define therebetween a narrow space which is accessible in a base to top direction.

The present invention also provides a light housing for a lighting device, said light housing including a light source holder at one end thereof, said light housing also including means to receive a mounting member at one end of said light housing opposite to said light source holder, said light housing being characterised by said light source holder allowing limited pivotal movement of said light source when said light source is mounted in said light source holder, said limited pivotal movement being in the range of 5° to 30°.

The present invention further provides a method of assembling a light housing as claimed in any one of the preceding claims, said method including the steps of: attaching said cover to said box; inserting said tubular lens through said aperture; engaging said spigot with one end of said tubular lens; inserting said lighting source into the second end of said tubular lens; and securing said light source to said housing.

The present invention also provides light housing for a lighting device, said light housing including a first and second face and sides there around, a first side having a mounting spigot to receive one end of a tubular lens, and a second side opposite to said first side having an aperture therethrough, through which aperture tubular lens can pass and in which is received the other end of said tubular lens, said aperture and said mounting spigot being aligned.] *having a plurality of light source assemblies and the light housing rests against a device body in a retracted position. Each light source assembly includes at least one LED disposed in a hollow tubular lens of the light source assemblies.*

20 Claims, 8 Drawing Sheets

U.S. PATENT DOCUMENTS

| | | | | | |
|---|---|---|---|---|---|
| 4,598,340 | A | * | 7/1986 | Dwosh et al. | 362/98 |
| 5,143,442 | A | * | 9/1992 | Ishikawa et al. | 362/253 |
| 5,183,324 | A | * | 2/1993 | Thomas | 362/103 |
| 5,541,816 | A | * | 7/1996 | Miserendino | 362/106 |
| 5,605,394 | A | | 2/1997 | Chen | |
| 6,120,163 | A | | 9/2000 | Graber et al. | |
| 6,135,621 | A | | 10/2000 | Bach et al. | |
| 6,142,644 | A | * | 11/2000 | Leung | 362/98 |
| 6,155,699 | A | * | 12/2000 | Miller et al. | 362/293 |
| 6,428,172 | B1 | * | 8/2002 | Hutzel et al. | 359/838 |

FOREIGN PATENT DOCUMENTS

| | | | |
|---|---|---|---|
| EP | 449219 | B1 | 1/1995 |
| EP | 802369 | A2 | 10/1997 |
| GB | 287015 | A | 3/1928 |
| GB | 2341228 | A | 3/2000 |
| JP | 09-207661 | A | 8/1997 |
| WO | 01/01039 | A1 | 1/2001 |

OTHER PUBLICATIONS

Digikey Corporation, product catalog, Jan. 16, 2006, 1731–1749, 1755–1767, and 1769–1776, http://web.archive.org/web/20060116042626/dkc1.digikey.com/US/PDF/T061/Section.html.

* cited by examiner

LIGHTING DEVICE

Matter enclosed in heavy brackets [ ] appears in the original patent but forms no part of this reissue specification; matter printed in italics indicates the additions made by reissue.

[Pursuant to 35 USC §120 and 35 USC §365, this application claims the benefits of WO 02/081966 and co-pending U.S. Ser. No. 10/474,398.]

*RELATED APPLICATIONS*

*This application is a continuation of application Ser. No. 10/474,389, now U.S. Pat. No. 7,021,789 which is the National Stage of International Application No. PCT/AU02/00415, publication No. WO/2002/081966, filed Mar. 28, 2002, which claims the benefit of Australian Provisional Application No. AU PR4297, filed Apr. 9, 2001 and Australian Provisional Application No. AU PR4541, filed Apr. 23, 2001.*

FIELD OF THE INVENTION

The present invention relates to lighting devices such as flashlights and lanterns.

BACKGROUND OF THE INVENTION

The flashlights and lanterns disclosed in PCT/AU00/00720 the lighting devices contained therein require improvements thereto to extend the uses of such lighting devices.

In regards to the prior art discussed herein, the applicant does not concede that that prior art forms part of the common general knowledge in the art in Australia or elsewhere, at the priority date of this application.

SUMMARY OF THE INVENTION

The present invention provides a lighting device having a light housing including a light source being rotatably connected by a rotatable connection means to a lighting device body, said body having said rotatable connection means positioned so as to allow said light housing to lay adjacent said body and to define therebetween a narrow space which is accessible in a base to top direction.

The body is preferably dimensioned so that the depth of said body is less than the height or width. The height and width are selected so as to be capable of fitting into a pocket on an article of clothing. Preferably said height is in the range of 4 cm to 14 cm. Preferably the width is in the range of 4 cm to 14 cm and preferably the depth is in the range of 1 cm to 4 cm. The body can include a fold out foot. The fold out foot can also include formations thereon to allow said lighting device to be hung. Preferably means are provided to releasably hold said light source adjacent to said lighting device body. In a preferred embodiment said means to releasably hold said light source adjacent to said lighting device body comprise one or more protrusions which act as a camming means to provide a bias which must be overcome in order to rotate said light source from a position adjacent to said lighting device body.

The present invention also provides a lighting device having a light source assembly with a light source and a tubular lens surrounding said light source to provide an appearance similar to that of a fluorescent lamp when in use, said light source assembly being further characterised by the provision of a reflector co-operating with an end of said tubular lens opposite to said light source.

Preferably said light source is an LED or incandescent lamp.

Preferably said reflector is located within said tubular lens.

The reflector can be located on the end of a spigot. The spigot can be used to mount or position said tubular lens in said lighting device.

The reflector can be concave or convex. Preferably said reflector is dome shaped. Preferably said reflector and said cylindrical member are manufactured from the same material. The reflector and spigot can be integrally formed or alternatively joined together.

Preferably said reflector and spigot are formed from white polymeric material. Preferably said spigot is of a cylindrical shape.

The present invention further provides a light housing for a lighting device, said light housing including a first and second face and sides there around, a first side having a mounting spigot to receive one end of a tubular lens, and a second side opposite to said first side having an aperture therethrough, through which aperture tubular lens can pass and in which is received the other end of said tubular lens, said aperture and said mounting spigot being aligned.

Preferably an internal face of one of said first or second faces includes a channel extending from said aperture to said spigot. Preferably the spigot is located in said first side so that when the tubular lens is mounted thereon, opposing locations on said tubular lens in the vicinity of said spigot are in contact with respective internal surfaces of said first and second face.

Said first face can be one of the following:

opaque and reflective on an internal face; transparent; translucent.

The second face can be one or more of the following:

transparent; translucent; or opaque and reflective on an internal face when said first face is transparent or translucent.

Preferably said tubular lens is held in said light housing by a light source projecting through said aperture.

The light source can pass into said tubular lens.

The light source can be an LED or an incandescent lamp. Said light housing can include an open box with said first face and said sides, said second face being a cover which is attached to said box. Preferably said box is made from a white opaque reflective material and said cover is transparent.

The invention further provides a method of assembling a light housing as described above, said method including the steps of:

Attaching said cover to said box;

inserting said tubular lens through said aperture;

engaging said spigot with one end of said tubular lens;

inserting said lighting source into the second end of said tubular lens; and securing said light source to said housing.

The spigot can be attached to said cover or to said box.

The present invention also provides a method of assembling a light housing as described above, said method including the steps of:

locating said light source through said aperture and attaching same to said housing;

connecting one end of said tubular lens to said spigot on said cover;

guiding the free end of said tubular lens onto said light source;

rotating said cover around said light source until said cover engages said box;

securing said cover to said box.

The present invention further provides a light housing for a lighting device, said light housing including a light source holder at one end thereof, said light housing also including means to receive a mounting member at one end of said light housing opposite to said light source holder, said light housing being characterised by said light source holder allowing limited pivotal movement of said light source when said light source is mounted in said light source holder, said limited pivotal movement being in the range of 5° to 30°. This pivotal movement allows the light source to be oriented at an angle so that the lens assembly can be mounted thereon and rotated in position into the light housing.

BRIEF DESCRIPTION OF THE DRAWINGS

An embodiment of the present invention, will now be described, by way of example only, with reference to the accompanying drawings in which.

DETAILED DESCRIPTION OF THE EMBODIMENTS

Figure 1:
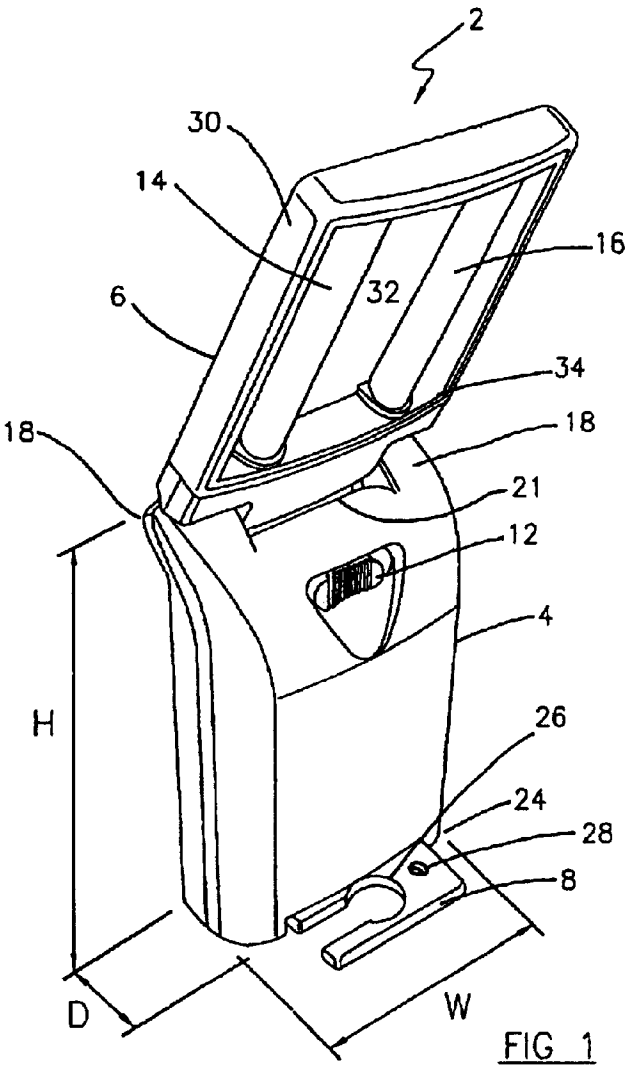
FIG. 1 is a front perspective view of a lighting device with all features fully extended.
Figure 2:
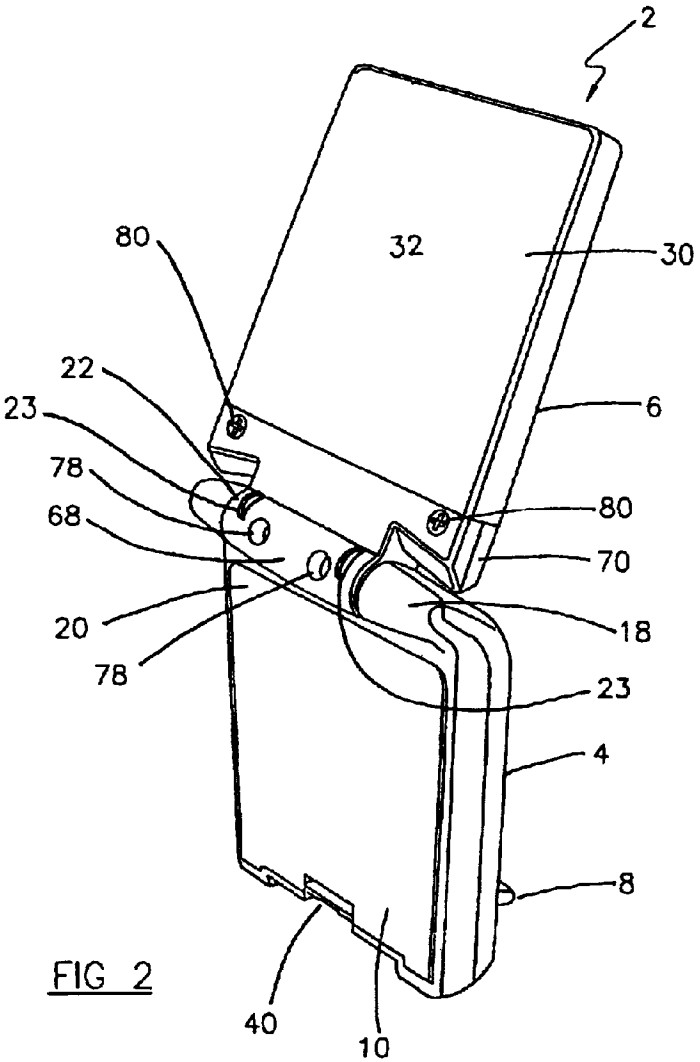
FIG. 2 is a rear view of the apparatus of FIG. 1.

Illustrated in FIGS. 1 and 2 is a lighting device 2 which has a body 4 and a light housing 6. The base of the body 4 has a foot 8 that is rotatably attached to the body 4. The foot 8 is illustrated in the extended position.

The body 4 includes a rear face 20 having a cover 10 the removal of which gains access to the battery or dry cell compartment and a switch 12 to switch on the light source assemblies 14 and 16 either both at the same time or one thereof.

The body 4 is of a generally rectangular construction having a light housing mounting 18 which is offset in a rearward direction from the rear face 20. The light housing mounting 18 has rotatably attached to it the base 22 of the light housing 6. The base 22 of the light housing 6 additionally includes two raised projections 23 which act as a camming means to releasably hold the light housing in a closed position against said body as will be described below.

The body 4 is in the main of a generally rectangular prism shape where the height and width are dimensioned so as to be capable of fitting into a pocket on an article of clothing such as a top pocket of a shirt or jacket, pants or other clothing articles. To effect this the height is approximately 100 mm and the width is approximately 60 mm, and the depth is approximately 20 mm. Whilst these are the selected dimensions of the preferred embodiment the height could vary between 40 mm and 140 mm; the width could vary between 40 mm and 140 mm; and the depth can vary between 10 mm and 30 mm depending on pocket size.

The foot 8 is pivoted at the forward most lower most edge 24 on the body 4. As can be seen from FIG. 1 the foot 8 includes a key hole shaped slot 26 which allows the foot 8 to be attached to overhead rope or a tent rope etc to position the light for use by a user. Adjacent the slot 26 is a hole 28 which will allow the hanging of the light on a thin string or a twig or a nail of the like.

Figure 3:
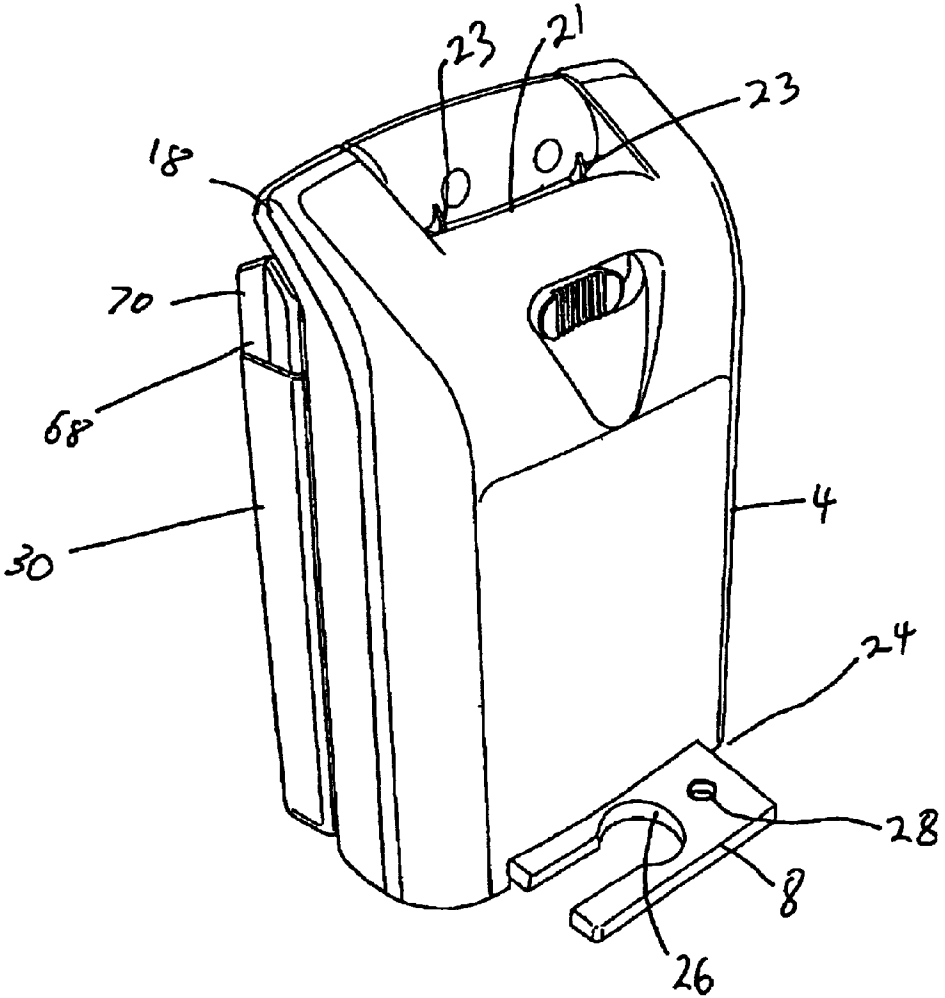
FIG. 3 is a front perspective view of the apparatus of FIG. 1 with its light housing in the retracted position.
Figure 4:
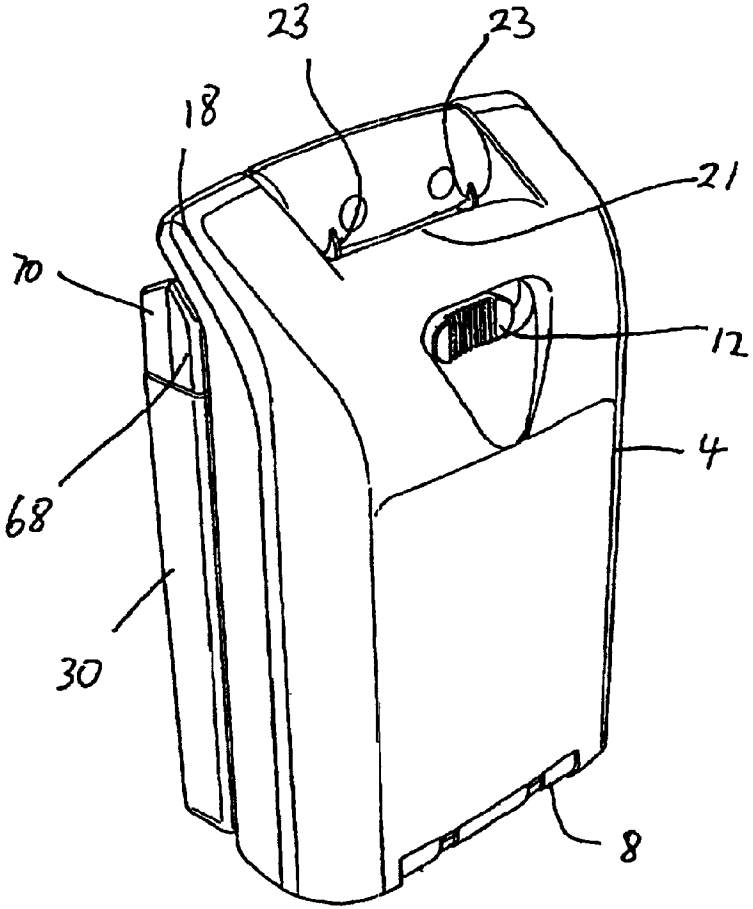
FIG. 4 illustrates a front perspective view of the lighting device of FIG. 3 with the foot retracted.
Figure 5:
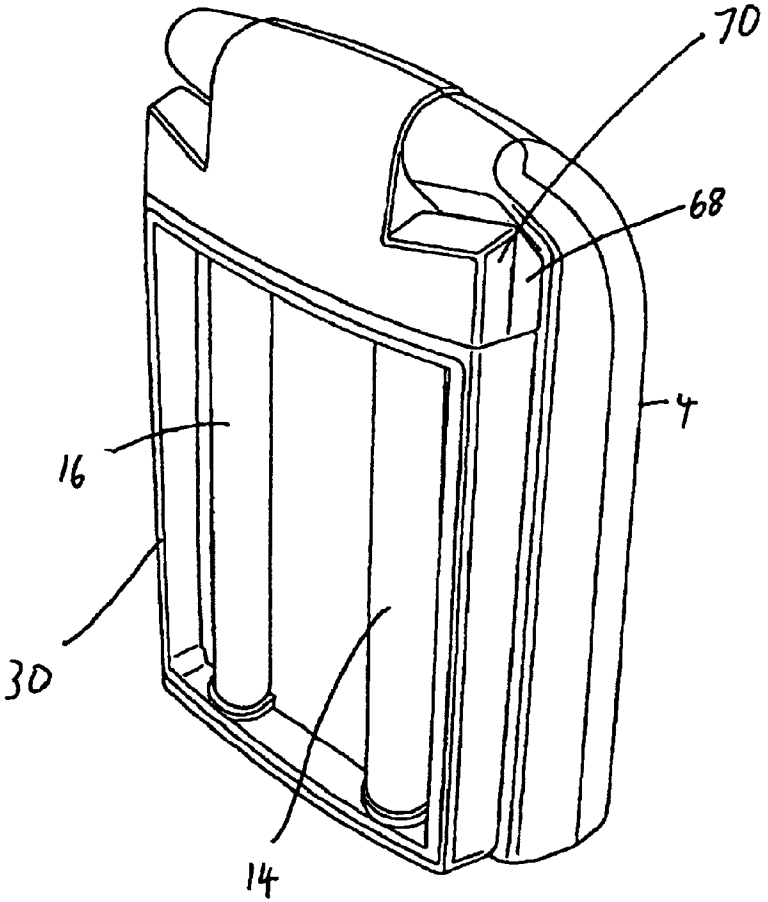
FIG. 5 illustrates a rear perspective view of the lighting device of FIG. 4.

As can be seen in FIGS. 1 to 4 the light housing 6 is able to be rotated from a fully retracted position such as that of FIGS. 3 to 5 to a fully extended position by travelling through an arc of greater than 180° to approximately 225° from its fully retracted position.

The two raised projections 23 act as a camming means to provide a locking bias to releasably hold the light housing in the retracted position.

The raised projections 23 are positioned on the base 22 of the light housing 6 such that when the light housing 6 is in a retracted position, as shown in FIGS. 3 and 4 the raised projections 23 are rotated beyond the crest of a curved edge 21 in the upper housing wall, between the light housing mountings 18. In order to rotate the light housing 6 relative to the body 4 the raised projections 23 must be urged past a curved edge in the upper housing wall 21 between the light housing mountings 18. In the retracted position the projections 23 rest against the upper housing wall 21 and exert a force against the upper housing wall 21 which holds the light housing 6 in the retracted position. Thus the force exerted by the raised projections 23 against the curved upper housing wall 21 provides a resistance against rotation of the light housing and releasably holds the light housing 6 in a retracted position.

Figure 12:
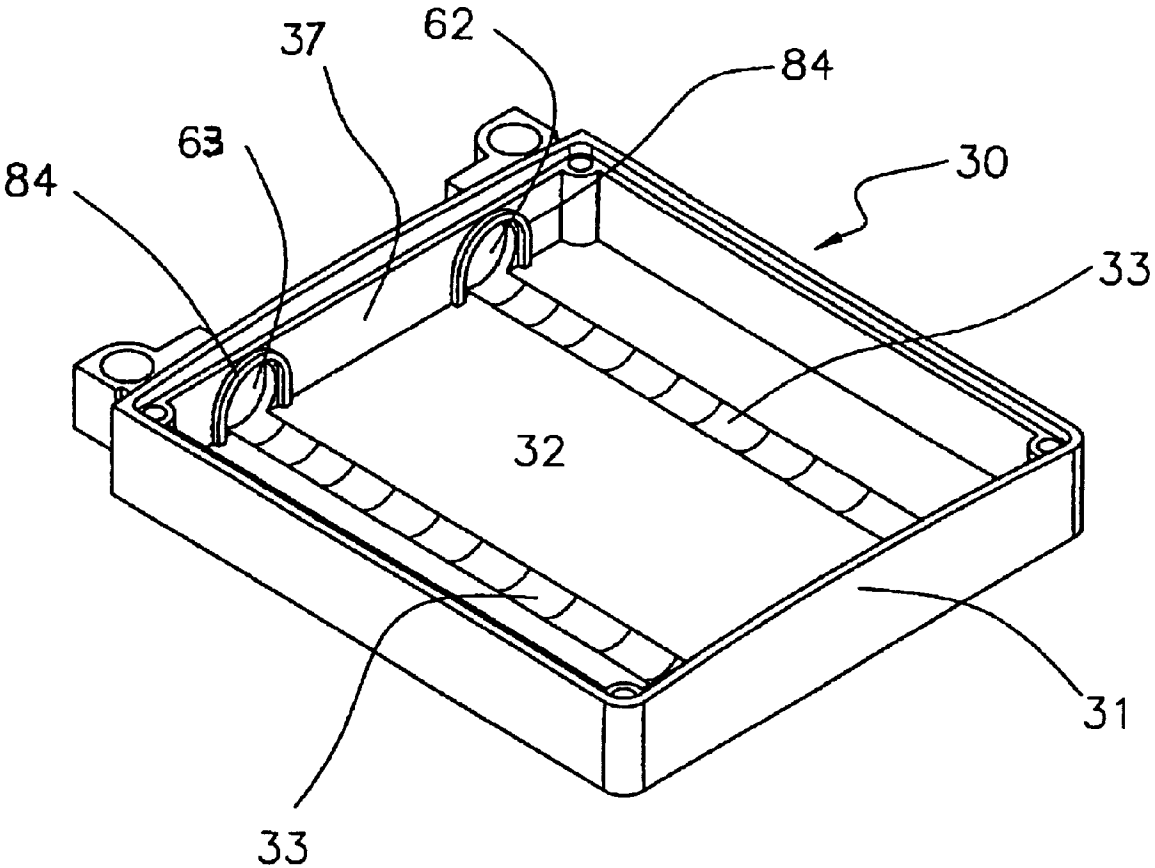
FIG. 12 illustrates a perspective view of a light box.

The light device 2 differs from the one disclosed in PCT/AU00/00720 in that the light housing 6 if preferably contained within a light box 30 as illustrated in FIG. 12 having an opaque rear face 32 and a clear forward cover 34. The forward rear and rear locations refer to the light housing 6 when it is in the fully extended position. As can be seen from FIG. 5 the front cover 34 is rearwardly facing in the fully retracted position. The light box 30 as illustrated in FIG. 12 includes two shallow, curved in cross section, channels 33 in which can sit tubular lenses 48 and 50.

Figure 6:
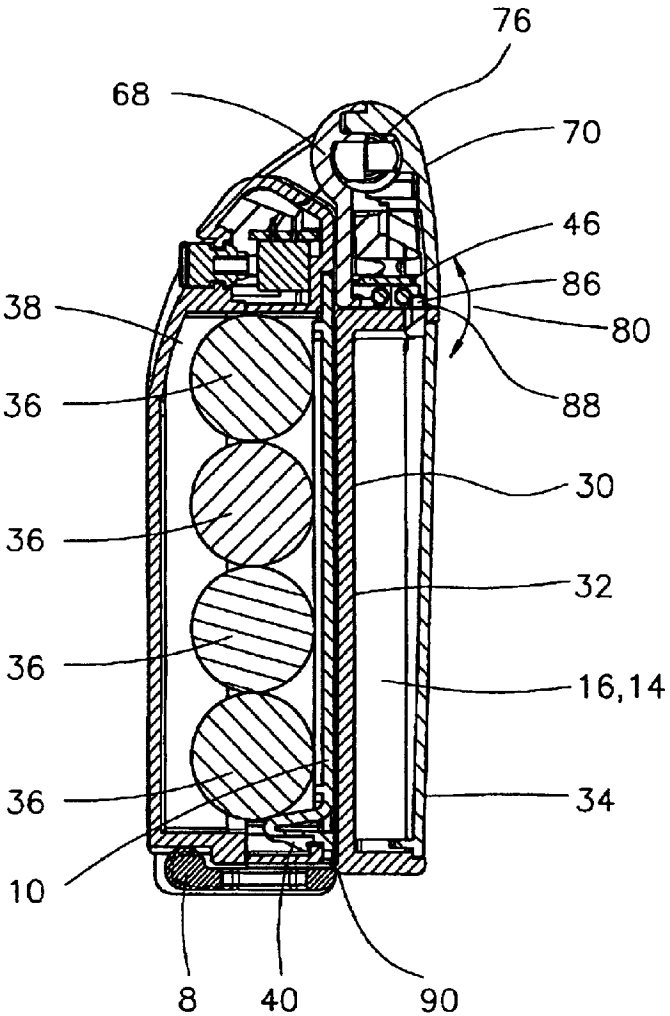
FIG. 6 illustrates a cross-section through the middle of the lighting device of FIG. 4.

As illustrated in FIG. 6 in cross section, the fully retracted lighting device 2 has four AA sized batteries 36 contained in the battery housing 38 which is closed by the cover 10 when secured in place by the latch 40.

Preferably the rear face 32 of the light box 30 does not allow light to be transmitted therethrough, but acts as a reflector to assist in projecting light through the forward cover 34. In order to achieve this end one or more of the surfaces of the rear face 32 can either be coated in a reflective material, or have a reflective element, such as a reflective adhesive film or metallic reflector attached thereto. Alternatively, the rear face 32 can be formed of an opaque reflective material, such as a white plastics material. Furthermore the surface of the rear face 32, which is closest to the tubular lenses 48, 50 can be textured to provide a diffuse reflection, or polished to provide a specular reflection.

Figure 7:
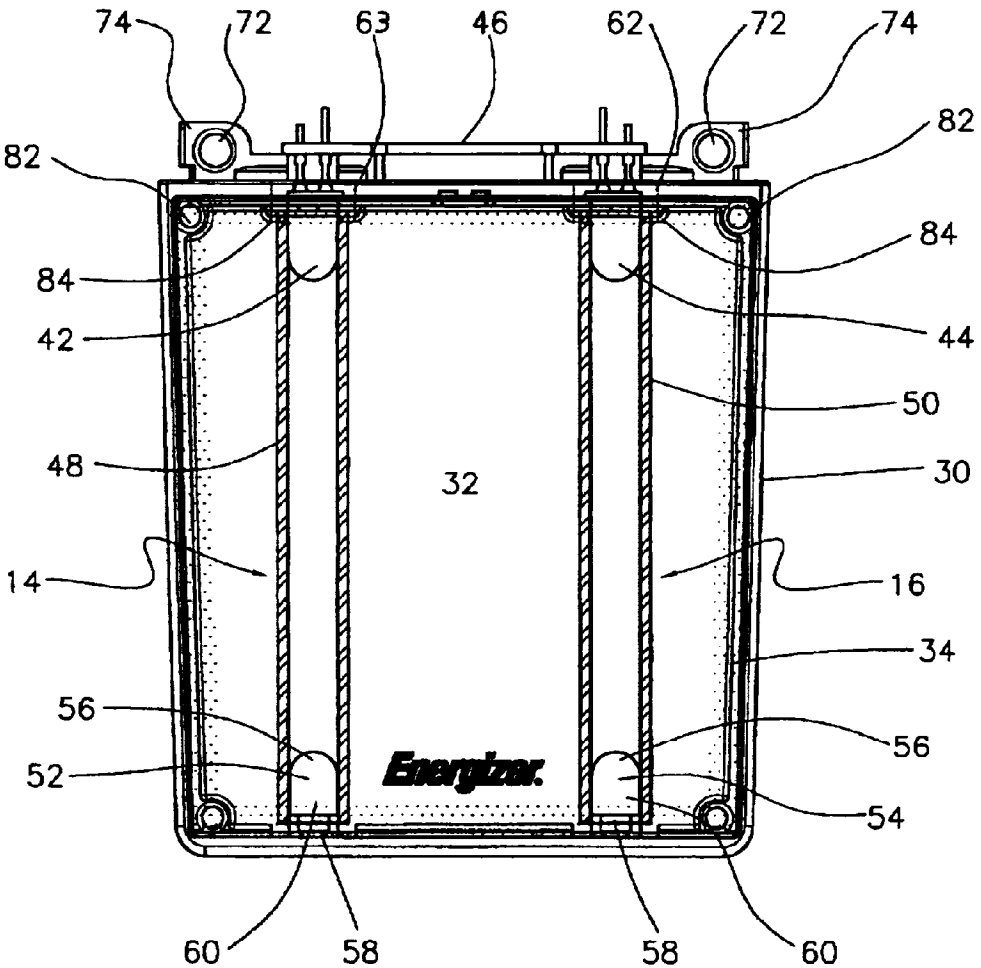
FIG. 7 illustrates a plan view of the light housing and some internal portions thereof.
Figure 7A:
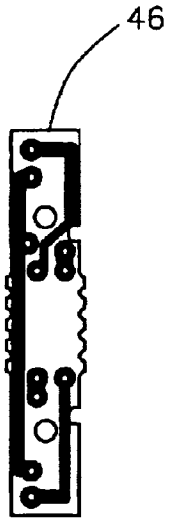
FIG. 7A illustrates a front view of a printed circuit board.

As can be seen from FIGS. 1 to 6 the light housing 6 is made from light box 30 and holds the two light source assemblies 14 and 16. The light sources assemblies 14 and 16 are comprised of LEDs 42 and 44 respectively, translucent tubular lenses 48 and 50 respectively and securing spigots 52 and 54 respectively. As illustrated in FIG. 7 the LEDs 42 and 44 are mounted on a printed circuit board 46. The printed circuit board 46 is illustrated in more detail in FIG. 7A.

Figure 10:
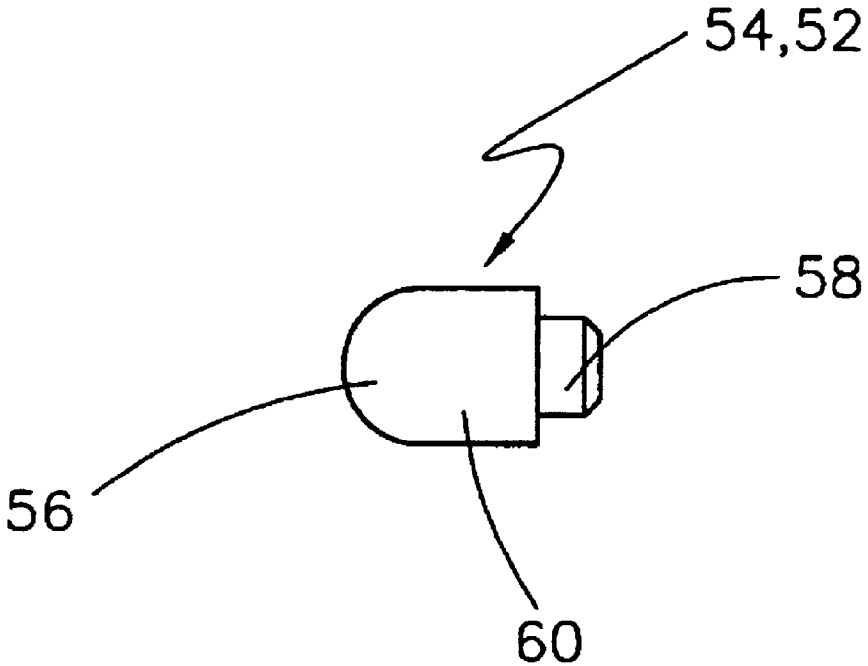
FIG. 10 illustrates the spigot.
Figure 11:
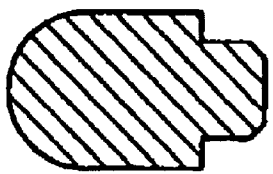
FIG. 11 illustrates the spigot in cross section.

Each securing spigot 52 and 54 includes a domed end 56 which is a reflector of light emitted from the LEDs 42 and 44. The spigots 54 and 52 are illustrated in more detail in FIG. 10. The spigots 54 and 52 have a peg 58 extending away from the dome 56 and a generally cylindrical body 60. The outside diameter of the cylindrical body 60 is sized so that the spigots 52 and 54 can slide into the internal diameter of the tubular lenses 48 and 50. In turn the tubular lenses 48 and 50 are sized so as to receive within their internal diameter the respective LEDs 42 and 44.

As can be seen in FIGS. 7 and 12 the light box 30 has two apertures 63 and 62 which allow for the assembly of the lights source assemblies 14 and 16 within the light box 30. This will be described in more detail below.

Figure 8:
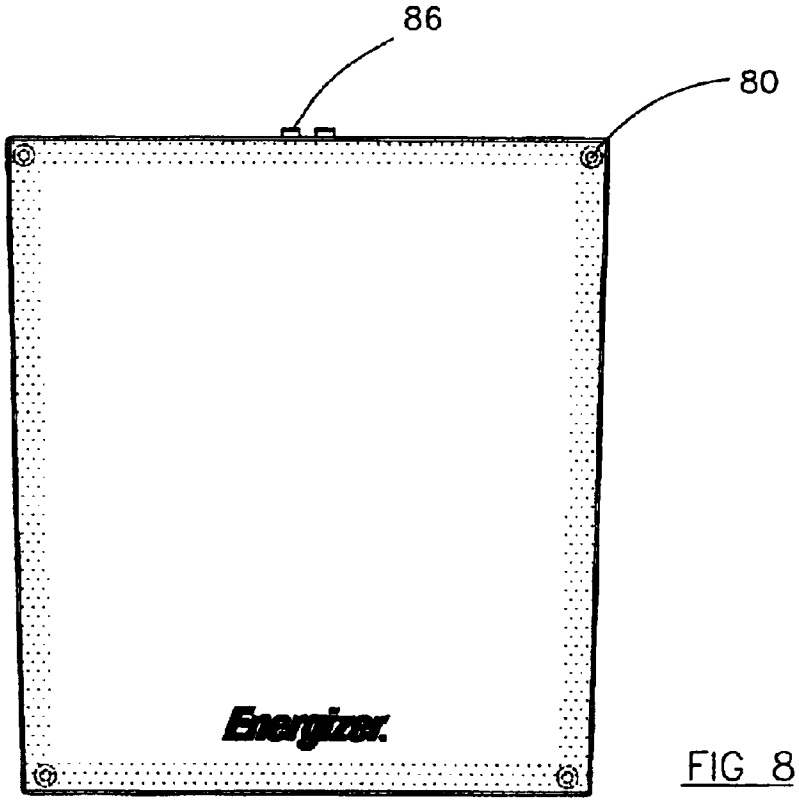
FIG. 8 illustrates the cover of the light housing in plan view.
Figure 9:
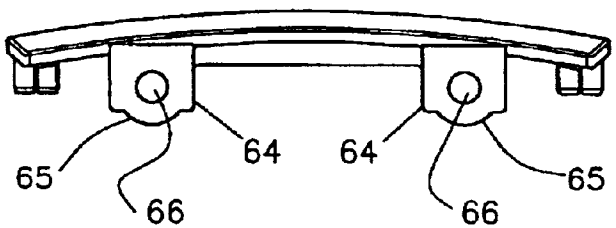
FIG. 9 illustrates a side view of the cover of FIG. 8.

Illustrated in FIGS. 8 and 9 the cover 34 has two flanges 64 which each have an aperture 66 therethrough. The flanges 64 also have a curved projection 65, which will sit in the channel 33 when the cover 34 is attached to light box 30. The aperture 66 receives the peg 58 on each of spigots 52 and 54 so as to mount the spigots 52 and 54 on the cover as illustrated in FIG. 7.

For this embodiment to assemble the light housing 6, the pivoting base 22 (which is made up of rear half 68 and front half 70), and the light box 30 are assembled together with the printed circuit board 46 and LEDs 42 and 44. To do this assembly spigots (not illustrated) on front half 70 are received in apertures 72 on light box mounting 74 to form an interim sub assembly. The printed circuit board 46 and soldered LEDs 42 and 44 are connected by wires to the body 4 which wires pass through stub axles 76 on the light housing mounting 18. The printed circuit board 46 is then positioned so that the LEDs 42 and 44 protrude into the apertures 62 and 60 respectively. The printed circuit board 46 is prevented from moving on the front half 70 by means of a series of ribs or projections (not illustrated). The front half 70 and clipped in light box 30 with the printed circuit board 46 are then mated with the rear half 68 around the stub axle 76 (there are two of these hollow stub axles or cantilevered pivots 76 but only one is visible) so as to sandwich the axle 76 between the halves 70 and 68 which in turn are sandwiching the end of the light box 30 at the other end of halves 70 and 68. The halves 70 and 68 are then secured by four screws 78 and 80. The screws 80 pass into the spigots on front half 70 which pass through the aperture 72 on light box mounting 74. During this sub assembly the cover 34 is not in position.

Next the spigots 52 and 54 are mounted onto the cover 34 by insertion into apertures 66 in flanges 64.

The mounting of the printed circuit board 46 between the halves 68 and 70 is such that the printed circuit board 46 is allowed a small degree of rotation in the direction of arrow 80. This small degree of rotation measuring approximately 5° to 30° allows the LEDs 42 and 44 to assume an elevation relative to the rear face 32.

To assemble the light source assemblies 14 and 16, the distal ends of the tubular lenses 48 and 50 are loosely mounted onto the cover 34 at one end by slipping the lenses 48 and 50 over the spigots 52 and 54. Then the cover 34 is held at an angle whereby the proximal ends of the tubular lenses 48 and 50 receive at least a portion of the extremities of the LEDs 42 and 44. The channels 33 assist in guiding the tubular lenses 48 and 50 to the LEDs 42 and 44. The cover 34 is then moved towards the light box 32 so that four downwardly extending spigots 80 on cover 34 will be received in cylindrical mounts 82 on the light box 30. As the cover 34 approaches the light box 30 pressure or force is applied to the cover 34 so as to sandwich the tubular lenses 48 and 50 between their respective LEDs 42 and 44 and spigots 52 and 54.

The LED end of the tubular lenses 48 and 50 pass through a raised entry 84 on the light box 30 which prevents any lateral movement of the tubular lenses 48 or 50 when the light housing assembly 6 is completed. Any axial movement of the tubular lenses 48 and 50 is prevented by the LEDs 42 and 44 (and spigots 52 and 54) which have a flanged end as is common with LEDs. Once the respective spigots 80 and cylindrical mounts 84 are aligned, the cover 34 is simply clipped into place with flexible spigots 86 being pushed towards the centre of the cover 34 until they are aligned with an aperture 88 in the light box 30, where upon the spigots 86 will proceed into aperture 88 to thus lock the cover 34 in position on the light box. Once this happens the tubular lenses 48 and 50 are located in the channels 33. The two longitudinal edges of the channels 33 will thus keep the tubular lenses straight when the light housing 6 is assembled and in use.

In an alternative method of assembly the cover 34 can be pre-subassembled to the light box 30. In this assembly method, the cover 34 will first have attached to it the spigots 52 and 54. Once this sub-assembly is completed the tubular lenses 48 and 50 can be passed through the apertures 62 and 64 and guided by channels 33 so that the distal end of the tubular lenses 48 and 50 will be placed over the spigots 52 and 54 with the proximal end of the tubular lenses 48 and 50 protruding through the raised entries 84.

The next stage in the assembly of the light housing 6 is to mount the light box 30 by means of apertures 72 on light box mounting 74 onto the front half 70 of the light housing base 22 to form an interim sub assembly. At this point the printed circuit board 46 and the two LEDs 42 and 44 can then be positioned into the proximal ends of the tubular lens 48 and 50 thus securing the two tubular lenses 48 and 50 in position. The printed circuit board 46 is then held in the light housing by the rear half 68 of the base 22 being attached while simultaneously capturing the hollow stub axles 76. The power supply leads for the LEDs 42 and 44 pass through the hollow stub axles 76.

With this alternative method if desired, the spigots 52 and 54 need not be mounted to the cover 34 per se but rather could be attached or received by the wall 31 of the light box 30 opposite to the wall 37 containing apertures 62 and 64. In which case the assembly procedure will continue as described in the alternative assembly method.

A lighting device 2 such as that described above provides a space 90 between the rear panel 32 and the cover 10 when the foot 8 is in the retracted position as illustrated in the cross section of FIG. 6.

The space 90 between cover 10 and rear panel 32 can be widened by rotating these two components relative to each other to a small extent, say 5° to 10°. Because of the retraction of the foot 8, access to the space 90 is clear and unobstructed thus allowing the body 4 to be placed in a pocket with the material of the pocket lying inside the space 90. Additionally the body 4 can be held by a user's belt; pant's elastic; draw cord; string or chain around a person's neck, to the person with the light housing 6 rotated to a position whereby it is ready for use.

The pivotal connection between the light housing 6 and body 4 can be provided with a degree of friction or resistance to movement. This friction or resistance can assist the lighting device 2 to sandwich a pocket wall in an effective manner. Gravity will keep the lighting device on the pocket wall providing the direction of opening or entry to the pocket will allow gravity to act in a positive manner. Otherwise the degree of friction or resistance to rotation the light housing will assist in positioning the light 2 to allow use of the light 2. In a particularly advantageous embodiment a locking mechanism, such as the camming action of the raised protrusions 23 as described above, can be used to providing a small clamping force to hold the lighting device 2 in place whilst hung on a pocket or the like.

If desired the light 2 can be hung from the neck line of an article of clothing so as to centre the light and allow reading therewith in low light situations such as when travelling, camping purposes, aeroplanes and the like.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

The invention claimed is:

1. A lighting device comprising:

a lighting device body containing a battery compartment, said lighting device body having a terminal mounting edge;

a light housing having a rear face and a forward cover, said light housing enclosing a plurality of light source assemblies and said light housing rests against the lighting device body in a retracted position;

wherein each light source assembly includes at least one LED, which is disposed in a hollow tubular lens of the light source assemblies; and wherein the light housing is rotatably attached to the terminal mounting edge so the forward face of the light housing can be selectively repositioned between 180° and 225° relative to the retracted position.

2. The lighting device of claim 1 further comprising at least one raised projection on along the terminal mounting edge to provide a locking bias to releasably hold the light housing in the retracted positioned.

3. The lighting device of claim 2 wherein the rear face does not allow light to be transmitted therethrough.

4. The lighting device of claim 1 wherein the rear face does not allow light to be transmitted therethrough.

5. The lighting device of claim 1, wherein the forward cover is clear.

6. The lighting device of claim 1, wherein one or more interior surfaces of the rear face is coated in a reflective material.

7. The lighting device of claim 1, wherein one or more interior surfaces of the rear face includes a reflective element.

8. The lighting device of claim 1, wherein each light source assembly further includes a reflective spigot located on an end of the tubular lens.

9. The lighting device of claim 1, wherein the light housing directs light away from the rear face of the light housing.

10. The lighting device of claim 1, wherein enclosing the plurality of light source assemblies defines a light box and the tubular lens of each light source assembly extends from a first end of the light box to a second end of the light box.

11. The ligJxting device of claim 10, wherein the first end is opposite the second end.

12. The lighting device of claim 1 wherein the light housing includes a light box that includes a proximal end located nearer to the terminal mounting edge and a distal end located farther from the terminal mounting edge, a tubular lens of the light source assembly is disposed in the light box., and the tubular lens extends longitudinally from the proximal end to the distal end.

13. A lighting device comprising:

a lighting device body containing a battery compartment, said lighting device body having a terminal mounting edge;

a lighting housing having a rear face and a light transmissive forward cover, wherein the lighting housing is rotatably attached to the terminal mounting edge for movement to a first, retracted position in which the forward cover faces the lighting device body and to a second, open position in which the forward cover is located at an angle between [1800] *180°* and [2250] *225°* relative to the first position;

a first tubular, light transmissive lens disposed in the lighting housing, wherein the first lens includes first and second opposing sides respectively with openings into the lens; and first and second LEDS respectively disposed in the openings of the first lens.

14. The lighting device of claim 13 wherein the first LED includes a domed end and the domed end is received in the first lens.

15. The lighting device of claim 13 wherein the first tubular lens includes an internal diameter that is sized to receive the first LED.

16. The lighting device of claim 13 wherein the first tubular lens is translucent and the light transmissive forward cover is clear.

17. The lighting device of claim 13 wherein the first lens includes a longitudinal axis and the lighting housing includes a light box having first and second ends, wherein the first lens extends longitudinally from the first end to the second end.

18. The lighting device of claim 13 wherein the lighting housing travels through an arc of approximately 225° relative to the first position.

19. The lighting device of claim 13, further including a second tubular, light transmissive lens disposed in the lighting housing and a third LED disposed in the second tubular lens, wherein the lighting housing includes a proximal end located nearer to the terminal mounting end and a distal end located farther from the terminal mounting end, the first and second tubular lenses each include a longitudinal axis, the first and third LEDs are located at the proximal end of the lighting housing, the first tubular lens is located between the first LED and the distal end of the lighting housing with the longitudinal axis of the first lens intersecting the distal end of the lighting housing, and the second tubular lens is located between the third LED and the distal end of the lighting housing with the longitudinal axis of the second lens intersecting the distal end of the lighting housing.

20. A lighting device, comprising:

a body, including: a terminal mounting edge; and a battery compartment that receives a battery;

a light source assembly, including: a light emitting diode (LED), which is illuminated with power supplied by the battery; and a tubular lens, wherein the LED and the tubular lens are separate and distinct components of the light source assembly and the LED is partially disposed in the tubular lens; and a lighting housing, including: a rear face; and a forward cover, wherein the lighting housing: encloses the light source assembly; rests against the body in a retracted position, and is pivotably attached to the terminal mounting edge so as to selectively pivot between 180° and 225° relative to the retracted position.

* * * * *